(12) United States Patent
Bhatia et al.

(10) Patent No.: US 9,973,390 B2
(45) Date of Patent: May 15, 2018

(54) METHOD OF DISCOVERING NETWORK TOPOLOGY

(71) Applicants: Siddharth Bhatia, Karol Bagh (IN); Abhinay Prabhakar Padhye, San Jose, CA (US); Abhishek Jain, Chhattisgarh (IN); Niranjan Deepak Nandrekar, Kolhapur (IN)

(72) Inventors: Siddharth Bhatia, Karol Bagh (IN); Abhinay Prabhakar Padhye, San Jose, CA (US); Abhishek Jain, Chhattisgarh (IN); Niranjan Deepak Nandrekar, Kolhapur (IN)

(73) Assignee: FixStream Networks Inc., San Jose, CA (US)

( * ) Notice: Subject to any disclaimer, the term of this patent is extended or adjusted under 35 U.S.C. 154(b) by 194 days.

(21) Appl. No.: 15/150,333

(22) Filed: May 9, 2016

(65) Prior Publication Data

US 2016/0330080 A1 Nov. 10, 2016

Related U.S. Application Data

(60) Provisional application No. 62/158,868, filed on May 8, 2015.

(51) Int. Cl.
  *H04L 12/751* (2013.01)
  *H04L 12/24* (2006.01)
  *H04L 12/721* (2013.01)
  *H04L 12/713* (2013.01)

(52) U.S. Cl.
  CPC .............. *H04L 41/12* (2013.01); *H04L 45/02* (2013.01); *H04L 45/123* (2013.01); *H04L 45/586* (2013.01); *H04L 41/0213* (2013.01)

(58) Field of Classification Search
  CPC ....... H04L 41/12; H04L 45/02; H04L 45/123; H04L 45/586; H04L 41/0213
  See application file for complete search history.

(56) References Cited

U.S. PATENT DOCUMENTS

| 9,680,915 | B2* | 6/2017 | Pradhan | H04L 67/10 |
| 2009/0219835 | A1* | 9/2009 | Bandholz | H04L 12/462 370/255 |
| 2013/0250802 | A1* | 9/2013 | Yalagandula | H04L 41/12 370/254 |
| 2014/0036726 | A1* | 2/2014 | Kusumoto | H04L 45/02 370/254 |
| 2017/0195218 | A1* | 7/2017 | Schrum, Jr. | H04L 45/48 |

* cited by examiner

*Primary Examiner* — Hashim Bhatti
(74) *Attorney, Agent, or Firm* — K&L Gates LLP; Jordan A. Kwan

(57) ABSTRACT

Example methods, apparatuses, and systems are presented for discovery of how network devices are interconnected. A group of network devices may be discovered that are associated with each other may be determined. Using a system of the present disclosures, information is gathered from network devices using networking protocols and links are identified. Protocols suggest how two or more network devices are connected to each other. Every interface on the physical or virtual device may be associated with multiple types of links identified by various protocols. A weight is assigned to each link using a weight mapping table. Next a method to reduce the number of multiple links is applied. The reduction method uses the link associated with an interface with the lowest weight to map the network topology, in some embodiments.

20 Claims, 8 Drawing Sheets

| Assigning weights to links forming a link between two network components | | | |
|---|---|---|---|
| Link type | Weight | Example weight | Possible source of Data |
| Virtual Machine - virtual switch | N | N=10(this is the base) | Connector to vswitch or VM manager |
| Parent child relationship<br>Virtual Machine – virtual switch | N+15 | 25 | Connector to vswitch or VM manager |
| Virtual Machine – Top of rack switch | N+5 | 15 | MAC address table of TOR |
| Virtual Machine – default gateway | N+10 | 20 | Connector to virtual Machine |
| Top of rack switch – bare Metal | N+5 | 15 | MAC address table of TOR |
| Top of rack switch – bare metal | N | 10 | Connector to system manager |
| Top of rack switch – vmNic of (Host OS/ Hypervisor) | N+5 | 15 | MAC address table of TOR |
| Virtual Switch – server virtualized NIC | N | 10 | Connector to vswitch or VM manager |
| Parent child relationship<br>Virtual Switch – server virtualized NIC | N+15 | 25 | Connector to vswitch or VM manager |
| Top of rack switch – bare Metal | N+2 | 12 | LLDP, CDP or any link discovery protocol |
| Network component – network component | N+2 | 12 | LLDP, CDP or any link discovery protocol |
| Network component – network component | N+4 | 14 | Manual human entry |

FIG. 5

METHOD OF DISCOVERING NETWORK TOPOLOGY

CROSS REFERENCES TO RELATED APPLICATIONS

This application claims the benefits of U.S. Provisional Application 62/158,868, filed May 8, 2015, and titled "METHOD OF DISCOVERING NETWORK TOPOLOGY," the disclosure of which is hereby incorporated herein by reference in its entirety and for all purposes.

TECHNICAL FIELD

The subject matter disclosed herein generally relates to processing data. In some example embodiments, the present disclosures relate to methods for discovering a network topology.

BACKGROUND

There are implementations to determine the physical/virtual topology using standards based protocols like Link Layer Discovery Protocol (LLDP) etc., proprietary protocols like Cisco Discovery Protocol (CDP), Juniper Discovery Protocol (JDP), etc.

There are also methods that leverage a combination of spanning tree protocol (STP) data, media access control (MAC) address tables, and address resolution protocol (ARP) tables to determine the network topology.

Server/blade-servers and virtual machine managers also provide the virtual topology mappings of the virtual machines and virtual switches in the blade/rack mount servers.

However, more efficient and accurate methods for discovering a network topology are possible, particularly when one or even few types of data are unable to map an entire network. It is desirable to leverage multiple types of network communication data to accurately discover a network topology.

BRIEF SUMMARY

A Network Topology is defined as set of network devices interconnected using Links. A discovery method of the present disclosures determines how network devices are interconnected. Based on this method of discovery, it identifies a group of network devices that are associated with each other. The information is gathered from network devices using networking protocols and links are identified. Protocols suggest how two or more network devices are connected to each other. Every interface on the physical or virtual device may be associated with multiple types of links identified by various protocols. A weight is assigned to each link using weight mapping table. Next we apply a method to reduce the number of multiple links. The reduction method uses the link associated with an interface with the lowest weight to map the network topology. This unique method of building Network topology using several network protocols and applying reduction method to build true network topology is the key to this invention.

In some embodiments, a method for discovering a network topology is presented. The network may include a plurality of network components all communicatively coupled together. The method includes: accessing, by a data collector module, network activity data for each component in the network via one or more network connector modules, the network activity data comprising evidence of a type of link between pairs of network components in the network; generating, by a correlation engine, a plurality of synthetic links, each synthetic representing a communicative connection between a first port of a first network component and a second port of a second network component, the generating synthetic links based on the network activity data; assigning, by the correlation engine, a numerical weight value to each of the plurality of synthetic links, the assigning for each synthetic link based on the evidence of a type of link established between the two network components comprising said synthetic link; conducting, by the correlation engine, a reduction logic routine that determines, for each network component and for each port of said network component, which synthetic link connected to said port is the most reduced weight; and transmitting, by the correlation engine to a topology mapping unit, for each network component and for each port of said network component, the reduced synthetic link for display as a direct link in a network topology map.

In some embodiments of the method, the network activity data comprises evidence of communication between network components derived from SNMP, ping, SSH/Telnet, NaviSecCli, NMAP, or Pysphere.

In some embodiments of the method, the network activity data comprises raw data of different types of network communications, and the method further comprises normalizing the network activity data by converting the different types of network communications to a common data format.

In some embodiments of the method, the correlation engine generates the synthetic links using CDP link creation logic, MAC address link creation logic, VMWARE integration logic, Link aggregation logic, and F5 load balancer virtual server logic.

In some embodiments of the method, the network components comprise at least one router, at least one switch, at least one physical server, and at least one virtual server. In some embodiments of the method, the network components further comprise at least one virtual machine manager and a system manager.

In some embodiments of the method, the type of link established between two network components that the weight values are based on includes: a virtual machine to virtual switch link type, a virtual machine to top of rack switch type, a top of rack switch to bare metal link type, and a virtual switch to server virtualized NIC link type.

In some embodiments, a second method for discovery a network topology is presented. The network may include a first network component directly communicatively coupled to a second network component, and the second network component directly communicatively coupled to a third network component. The method may include: accessing, by a data collector module, network activity data via one or more network connector modules, the network activity data comprising evidence of a type of link between the first and second network components, the first and third network components, and the second and third network components in the network; generating, by a correlation engine: a first synthetic link representing a first communicative connection between the first and second network components, a second synthetic link representing a second communicative connection between the first and third network components, and a third synthetic link representing a third communicative connection between the second and third network components, the generating the synthetic links based on the network activity data; assigning, by the correlation engine: a first numerical weight value to the first synthetic link, based on the evidence of a type of link established between the first and second network components, a second numerical weight value to the second synthetic link, based on the evidence of a type of link established between the first and third network components, and a third numerical weight value to the third synthetic link, based on the evidence of a type of link established between the second and third network components, wherein the second numerical weight value is greater than the first and third numerical weight values; conducting, by the correlation engine, a reduction logic routine that determines that: the first synthetic link is a direct link between the first and second network components, the third synthetic link is a direct link between the second and third network components, and the second synthetic link is not a direct link between any two network components, the determining based on comparing the first, second, and third numerical weights and performing reduction logic to determine the smallest weight values; and transmitting, by the correlation engine to a topology mapping unit, the first synthetic link and the third synthetic link for display as direct links in a network topology map.

In some embodiments, a system for discovering a network topology is presented. The network may comprise a plurality of network components all communicatively coupled together. The system may comprise: a data collector module comprising a first processor and a first memory; a correlation engine comprising a second processor and a second memory and communicatively coupled to the data collector; and a topology mapping unit comprising a display, a third processor and a third memory and communicatively coupled to the correlation engine; the data collector module configured to access network activity data for each component in the network via one or more network connector modules, the network activity data comprising evidence of a type of link between pairs of network components in the network; the correlation engine configured to: generate a plurality of synthetic links, each synthetic representing a communicative connection between a first port of a first network component and a second port of a second network component, the generating synthetic links based on the network activity data; assign a numerical weight value to each of the plurality of synthetic links, the assigning for each synthetic link based on the evidence of a type of link established between the two network components comprising said synthetic link; conduct a reduction logic routine that determines, for each network component and for each port of said network component, which synthetic link connected to said port is the most reduced weight; and transmit, by the correlation engine to a topology mapping unit, for each network component and for each port of said network component, the reduced synthetic link; and the topology mapping unit configured to display each reduced link as a direct link in a network topology map.

BRIEF DESCRIPTION OF THE DRAWINGS

Some embodiments are illustrated by way of example and not limitation in the figures of the accompanying drawings.

FIG. 1 demonstrates how network elements e.g., Router R1 is connected to Switch SW-4 and Switch SW-3. FIG. 1 demonstrates the complex Network Topology for a given Data Center.

FIG. 2 shows several possible links on a single interface of a network element that may be discovered by networking protocols and other mechanisms, according to some embodiments. All dotted lines and solid lines show possible links between network elements in a data center.

FIG. 3 demonstrates several protocols used for by a Data collector, according to some embodiments. The Data Collector may use protocols like SSH, SNMP and specific device Vendor based discovery mechanisms (e.g.: CIM, REST API etc.) to discover links. This information is provided to a Correlation mapping engine which stores the data in a database and applies reduction method on the stored data, which in turn gives information to Topology Mapping Unit. An end result is a Topology Map as shown in FIG. 1.

FIG. 5 is an example table of weights to be assigned to links, according to some embodiments.

DETAILED DESCRIPTION

There are several methods to determine the individual components of the network topology. A proposed method according to some embodiments of the present disclosures uses all of the data collected from individual components of the network. The data are correlated to form synthetic-links and are assigned weights to the synthetic-links. The weights are assigned using a predefined link type to weight mapping table. A reduction method then reduces the links with higher weights and finally the lowest weight links remain to map the topology.

The proposed weight assignment for synthetic links and the reduction method based on multiple discovery techniques to build the topology is believed to be novel and unique. In addition, aspects of the present disclosure discuss a unique framework (See FIG. 3) for comprehensive data collection and correlation.

As a summary, a high level flow on how this proposed solution works includes the following:
  gathering all data for all components of the networks;
  correlating the data to generate synthetic-links;
  assigning weights to the links;
  storing the links in a database;
  reducing the links based on weights and sending them to the topology mapping unit; and
  mapping the topology using the reduced links.

In some embodiments, a method to assign weights to synthetic-links created using gathered data is provided. By utilizing the assigned link weights, a reduction logic can be applied if there are multiple links identified on a single interface on a device, thereby getting an accurate physical/logical topology. Example methods to determine link weights for a network component in a communication network are described here. Such example methods also include a reduction logic on the number of links associated with an interface. It is based on weights assigned to the links for a device that are stored in a database where the stored links will be reduced and sent to the topology mapping unit. The reduction logic is used to reduce the plurality of links to determine the most accurate link on an interface of a device.

In some embodiments, the data collector uses multiple methods to collect data from the network components. Some of the methods for collecting data include, for example:
a) SNMP
b) ping
c) SSH/Telnet
d) NaviSecCli
e) NMAP
f) Packet captures (PCAP)
g) MAC address tables
h) And many others depending on the network element deployed in the data center.

Figure 1:
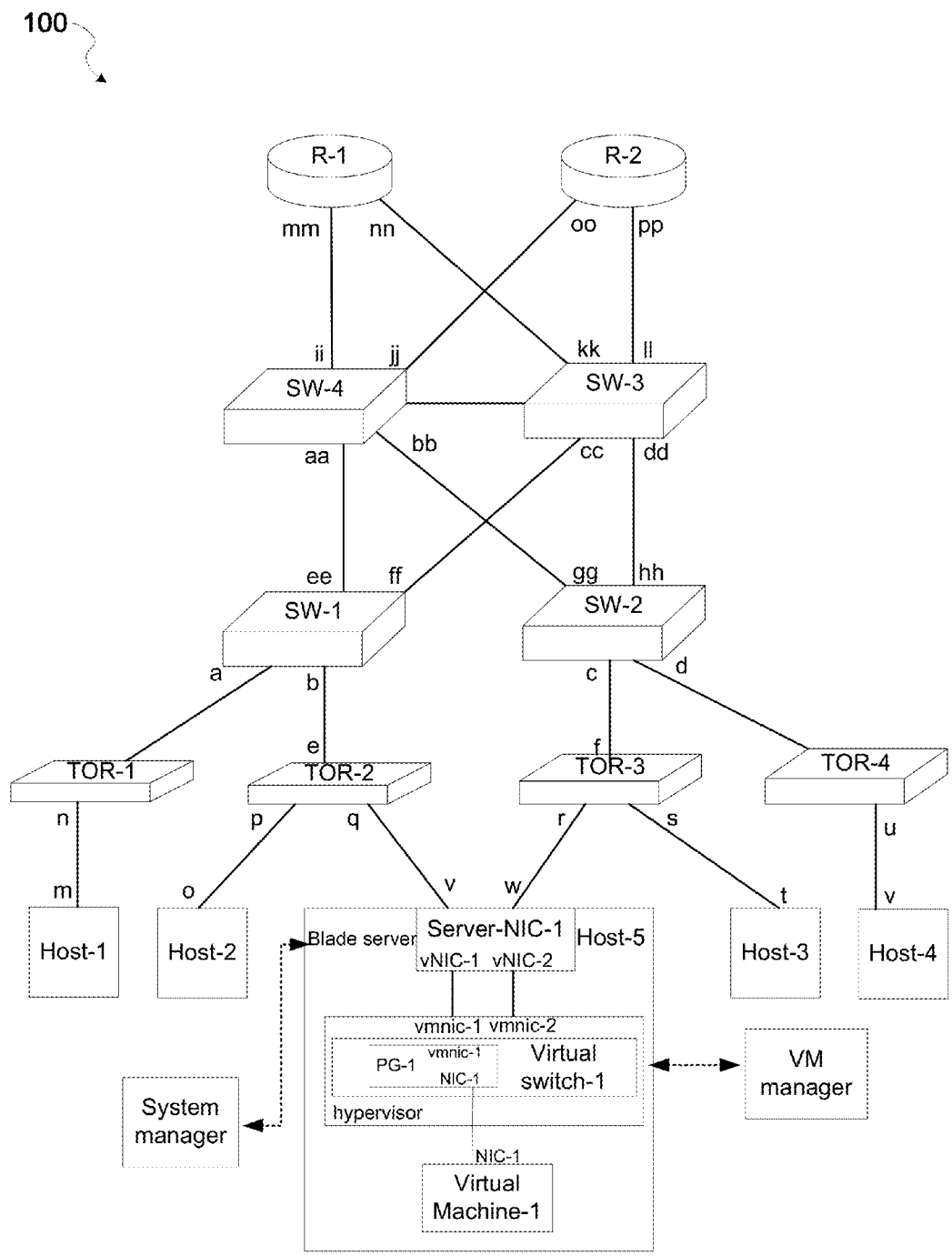
FIG. 1 includes a diagram of an example data center network.

Referring now to FIG. 1, illustration 100 includes a diagram of a virtualized computer system in which aspects of the present disclosure maybe practiced. The diagram shown is an example virtualized computer system that includes typical elements present in a network. This serves as an example environment for how the network topology discovery methods of the present disclosures may be used.

In FIG. 1, the topology of an example data center communication network is shown. As is understood in the field, a data center communication network includes a number of routers (represented by block containing letters R-1 and R-2), a number of switches (represented by block containing letters SW-1 through SW-4) and end hosts/Servers (represented by blocks containing letters Host-1 through Host-4) connected by number of links. It should be understood that the term "link" is not limited to wired media, such as cable, wireless media, microwave and other media technologies. The term "link" herein also refers to a logical internal connection between a virtual machines, such as NIC (network interface card), a virtual switch, and virtual NIC's of a virtualized server-NIC-1 of a server/blade.

Also in FIG. 1, Host-5 computer (also referred to herein as "servers/blade servers" are configured to provide virtualization based services to the data center communication network. The host-5 computer provides a virtualization layer that abstracts processor, memory, storage, and/or networking resources into multiple virtual machines that run side-by-side on the same physical host computer. Virtualization software can be installed directly on the server/blade server. The virtualization software partitions the physical server to run multiple virtual machines, and each virtual machine is a complete system in itself. Virtual machine-1 is logically connected to a virtual switch-1, which is in turn connected to a virtual network interface controller herein referred to as vNIC of the virtualized network interface controller (server-NIC-1) of the server. The NIC of the virtual machine is bridged to the vNIC of the virtualized network interface card of the server/blade through a port group-1.

A virtual machine (VM) management center (VM manager) is also included in the system. The VM management center manages the virtual infrastructure, including the virtual machines and virtual Switches. The virtual machine management software includes, for example: VMware Workstation, VMware vSphere and Citrix XenServer, etc.

A server/blade management center (system manager) is also included in the system. The server/blade management center manages the software and hardware components of the physical server/blade. An example includes UCSM by Cisco systems.

A layer 2 discovery protocol allows a device to advertise its identity and capabilities on a network to detect and store the identity, capabilities on a neighbor device on the local network. The link layer discovery protocol (LLDP) is an industry standard, vendor-neutral link layer protocol in the internet protocol suite used by network devices for advertising their identity, capabilities and neighbors on an Ethernet local area network. It is specified in standards document IEEE 802.1AB. Several similar protocols include the Cisco Discovery Protocol (CDP), Extreme Discovery Protocol, Foundry Discovery Protocol (FDP), Nortel Discovery Protocol (also known as SONMP), and Microsoft's Link Layer Topology Discovery (LLTD). The open systems interconnection model (OSI) is a model that characterizes and standardizes the internal functions of a communication system by portioning it into abstraction layers. Identification number ISO/IEC 7498-1 maintains it. Based on the seven layers of the OSI model, the second layer (data link layer) has two sub layers—Logical link control (LLC) layer and Media access control (MAC) layer. The Logical Link Control (LLC) sub layer of the data-link layer manages communications between devices over a single link of a network. LLC is defined in the IEEE 802.2 specification and supports both connectionless and connection-oriented services used by higher-layer protocols. IEEE 802.2 defines a number of fields in data-link layer frames that enable multiple higher-layer protocols to share a single physical data link. The Media Access Control (MAC) sub layer of the data link layer manages protocol access to the physical network medium. The IEEE MAC specification defines MAC addresses, which enable multiple devices to uniquely identify one another at the data link layer. The MAC address table referred here, is a table maintained by switches to logic media access control (MAC) addresses of stations to the ports on which they connect to the switch. The data collector also collects this data. The data collector will be discussed in more detail, below.

Figure 2:
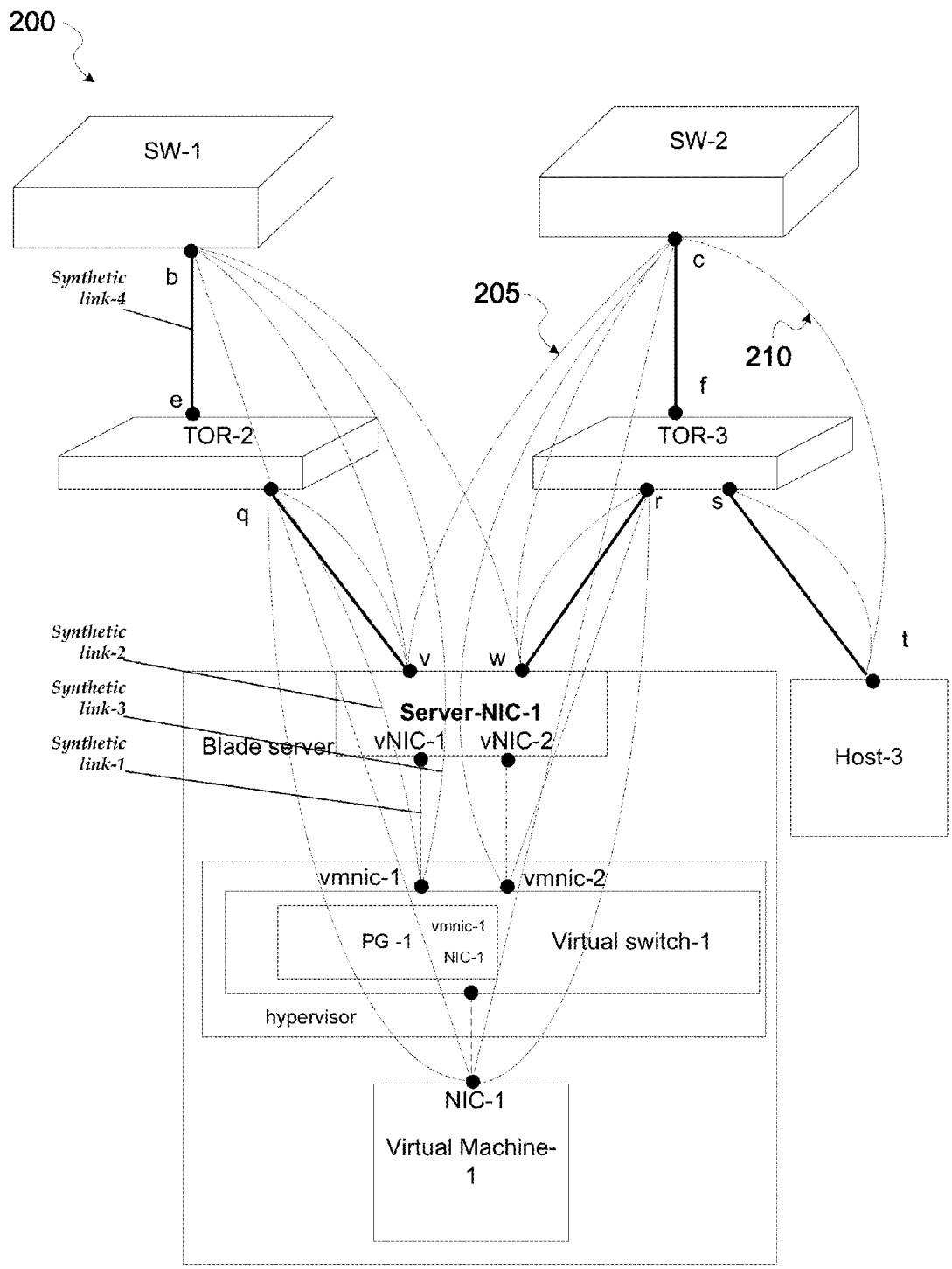
FIG. 2 includes a diagram of the correlated synthetic links before applying the reduction method according to some embodiments.

Referring to FIG. 2, illustration 200 shows an example of synthetic links between components in a network that may be discovered as part of a method of the present disclosures. The dotted curved lines between different nodes (e.g., 205, 210, "synthetic link-1," "synthetic link-2," "synthetic link-3") represent the synthetic links that have been determined by the methods of the present disclosures. As shown, these synthetic links are not necessarily direct links, as multiple connections may be present (e.g., link 210 represents connections between nodes "c" to "f" to "s" to t," and node "c" of device "SW-2" has connections to links 205, 210 and more which were discovered using different methods) that comprise the true nature of the links. Thus, discovering the direct links in order to determine the most accurate network topology would require a reduction of these synthetic links down to their simplest connections. This process will be described in more detail, below.

Figure 3:
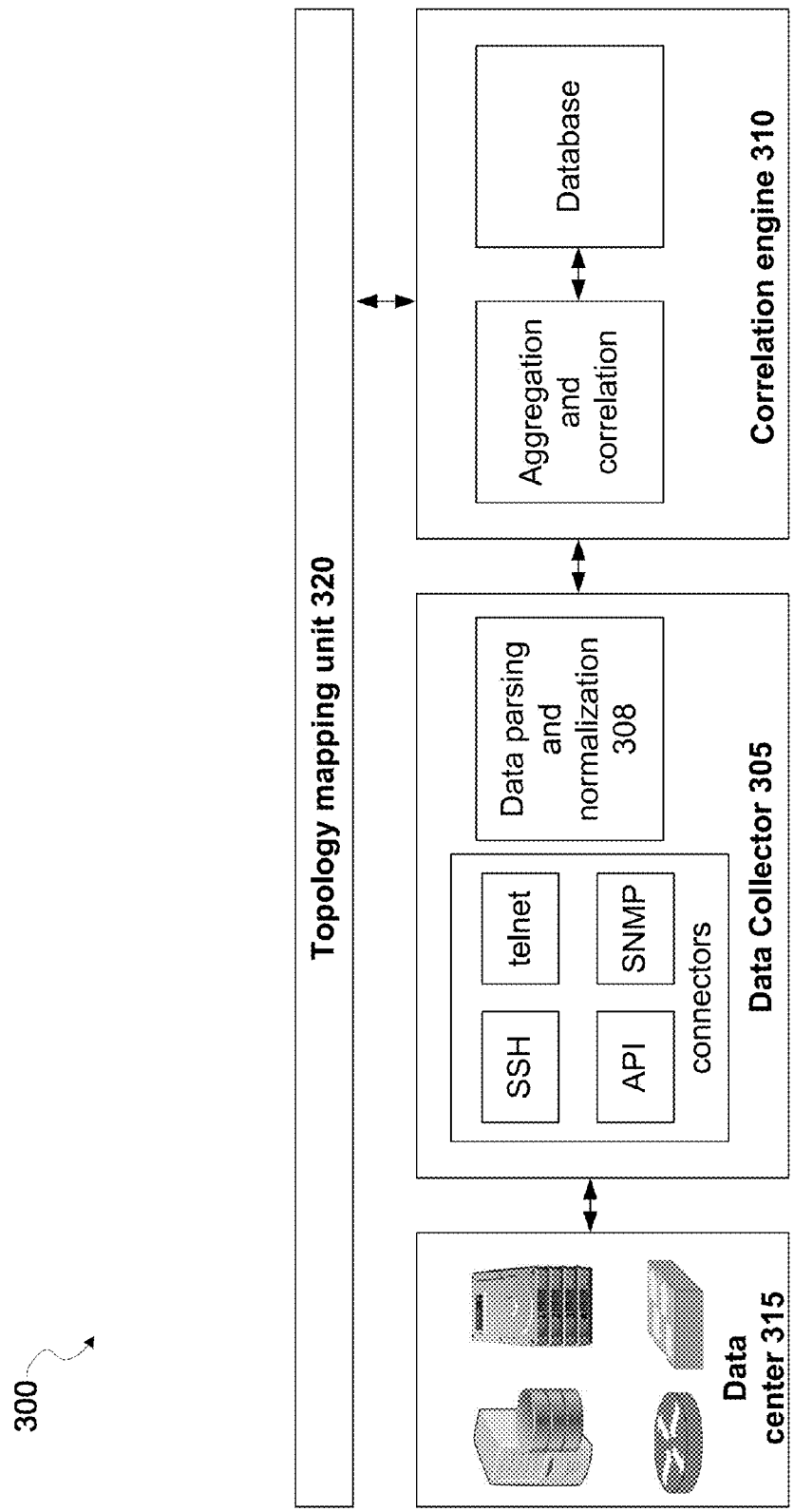
FIG. 3 includes a diagram of a unique framework laid out for a comprehensive data collection and correlation, according to some embodiments.

Referring to FIG. 3, illustration 300 shows a system architecture with various components used to complete a network topology discovery, according to some embodiments. Among these are a data collection module 305 and correlation module 310. The data collector 305 receives relevant information from network components of the data center 315 being discovered using the relevant connectors. The data collector 305 parses the data and normalizes it for the correlation engine 310 to process. The correlation engine 310 processes the data and stores the data in a database to apply a reduction method on the stored links and finally sends it to the topology mapping unit 320. Further details about these some of these components are described, below.

Data Collector 305

The data collector unit 305 triggers a set of predefined inputs for the relevant connector to collect the data from the network components.

A connector here is defined as a process, program, or executable that models interaction among components and a set of rules that govern those interactions.

Examples of the connectors used in methods of the present disclosure include but are not limited to:
a) SNMP;
b) ping;
c) SSH/Telnet;
d) NaviSecCli;
e) NMAP;
f) Pysphere;
g) PCAP;
h) Winexe; and
i) UCS SDK.

In some embodiments, Data Collector 305 is a software component that provides the following functionalities:
receiving data collection requests for given IP address ranges from process 400 (see FIG. 4A);
parsing and applying some preliminary data normalization/classification logic to the collected data; and
sending processed collected data to the correlation engine 310.

From a system deployment perspective, the data collector 305 may be deployed on Network Orchestrator, sitting on data center premise(s), and gets connected to the management network so that it can talk to various network devices, service appliances, host servers, and virtual machines via their management interface.

Data Parsing and Normalization 308

As a further example detail in the data collector 305, a data parsing and normalization module 308 may be included to provide data parsing and normalization of the data collected about each of the components in the network (e.g., see components of a network in FIGS. 1 and 2). The data parsing and normalization module 308 may be configured to parse different types of collected raw data from different types of devices with the assumption that format of the collected data and information to be abstracted out from the collected raw data is known.

In some embodiments, the data parsing and normalization module is configured to perform the following functionalities:
parse multiple collected raw data files simultaneously;
normalize the parsed data to a schema which is applicable for different sets of vendors and device platforms where ever possible to reduce the correlation logic;
output from data parsing in a common formatted file, such as JSON formatted files; and
if collected raw data is large, truncate the raw data into smaller files that are within the file size limit set on the data collector 305.

Correlation Engine 310

Correlation Engine 310, e.g., java based system, takes the normalized and parsed information from data collector 305 and correlates the scattered pieces of data and creates the necessary visualization. In some embodiments, the correlation engine 310 receives the data from the data collector 305 in queues and has a logic module for every type of computation.

The different example modules within the correlation engine 310 may include, but are not limited to:
CDP link creation logic;
MAC address link creation logic;
VMWARE integration logic;
Link aggregation logic; and
F5 load balancer virtual server logic.

Figure 4A:
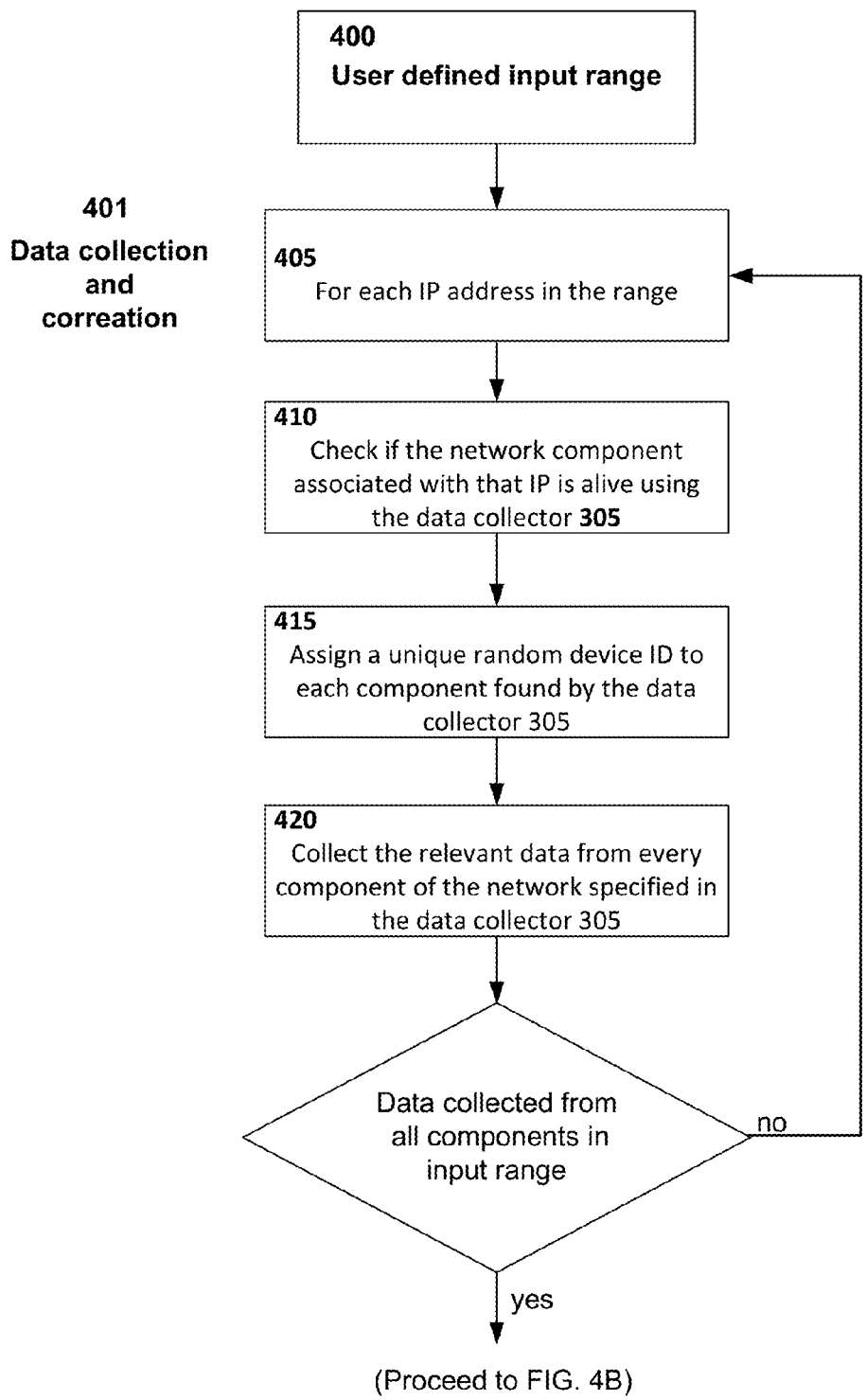
FIGS. 4A and 4B provide a flow chart for an overall view of the method according to some embodiments, including data collection and correlation.

Referring to FIG. 4A, a process for gathering data to determine links in the network and for reducing the links to generate an accurate network topology is described. To start the process of mapping the topology, a user defined input will be required in some embodiments, including providing IP address range and relevant credentials of the network components for the data collection and correlation module to start the discovery process. This initial start process will herein be referred to as process 400, which starts the general process described in FIGS. 4A and 4B, described herein.

The user defined range given in process 400 will be used by data collection and correlation process 401 to automatically discover every device in the network using identification and discovery methods (e.g., ping/ICMP, SNMP, SSH, combination of vendor specific API and more).

The data collector 305, after collecting relevant data, sends the data to be processed by the correlation engine 310 where the correlation logic is present. The combination of the connectors, data collector 305, correlation engine 310, database and topology mapping unit 320 in FIG. 3 may be used to conduct the method specified in process 401. For each device specified as a range of IP addresses and relevant credentials in process 400, the process 401 specifies the method as detailed below. The process for generating the links using the gathered data may be accomplished through conventional means existing in the art. Once these links are generated (for example, the synthetic links described in FIG. 2), the present disclosures discuss the unique framework to collect data and reduce the plurality of the links to an accurate network topology mapping.

At step 405, for each IP address in the range specified by the user input, proceed to step 410.

At step 410 the system described in FIG. 3 may be configured to scan and check if there is an alive network component associated with that IP address. This is done using the method specified in the data collector module 305.

Step 415 includes assigning a unique random Device ID to each network component found by the data collector module 305.

Step 420 includes collecting the relevant data from the network component. The data is collected again by the data collector module 305, by first identifying the network component type and then using the relevant connector to gather the information and parse the information.

A conditional statement after step 420 states if the relevant data is collected by the data collector 305 for every IP address specified in step 405, then proceed to step 425 (see FIG. 4B) else go back to step 405.

Figure 4B:
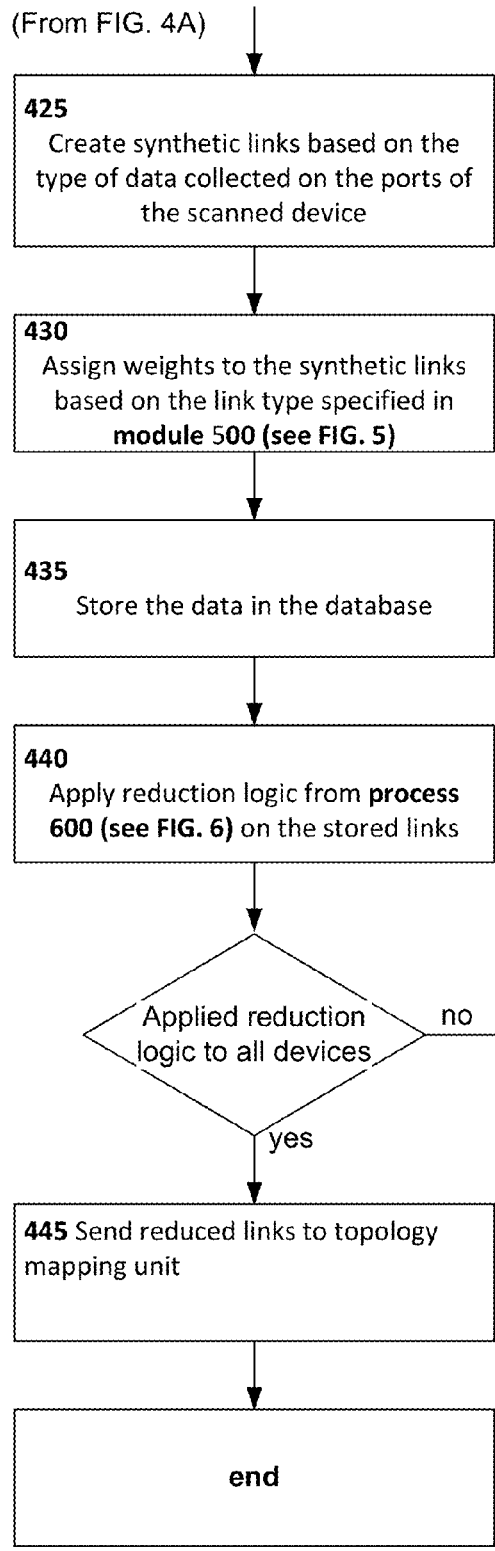

Proceeding to FIG. 4B, as a continuation of process 401, step 425 includes creating links using the collected data. These links at step 425 will be defined as synthetic links which will be further reduced in step 440. At step 425, one or more links will be formed from one interface of a single network component. With reference to FIG. 2, the synthetic links formed are shown as an example. For example, shown are synthetic link-1 (vmnic-1 to vNIC-1 of server-NIC-1), synthetic link-2 (vmnic-1 to port 'q' of TOR-2), synthetic link-3 (vmnic-1 to port 'b' of SW-1), synthetic link-4 (port 'e' of TOR-2 to port 'b' of SW-1). The correlation sub module of the module 500 (see FIG. 5) will have the logics to create these synthetic links and will be explained in detailed, below.

At step 430, the system of FIG. 3 may further be configured to assign predefined weights to all of the synthetic links using data in module 500, which specifies a table for predefined weights to be assigned to the synthetic links based on the type of link.

Step 435 includes, after assigning weights to the synthetic links in step 430, the synthetic links will be stored in a database e.g., elastic search etc.

At step 440, after step 7, the data collector 305 will have all the synthetic links stored between all the network components. The reduction logic (defined, for example, by process 600) will be used to reduce the plurality of the synthetic links between all the network components. Process 600 will also be discussed in detail, below.

A conditional statement after step 440 states that if the reduction logic is applied to all the network components, then proceed to step 445, else return back to step 440. This conditional statement may be performed by the correlation engine 310, for example.

Step 445 includes sending the links to the topology mapping unit 320 (see FIG. 3) to display the reduced links (e.g., filtered synthetic links). The reduced synthetic links are the links that will be used by the topology mapping module to display the true physical/logical topology of the data center communication network. This concludes an example of the method, where it is determined that the true physical/logical topology has been discovered through this reduction process.

Referring to FIG. 5, a module 500 is shown herein that includes a predefined database which relates to the type of communication link that is correlated by the correlation engine 305 and the weight in decimal number that needs to be assigned to the link, according to some embodiments. This database can be modified to accommodate more link types and weights for future and complex network considerations. The fourth column also describes the possible source of data used for correlation of the link. The link weight assigned to a link is a predefined decimal number used in the reduction process 600 to reduce the plurality of the links in the network physical/logical topology discovered by process 401. In some embodiments, the weights may be determined by a body of network data, where the weights reflect a degree of closeness or directness between two nodes at the ends of the specified link type. By convention, lower weights reflect a closer or more direct relationship. In other examples of the methods described herein, the weights may be reversed to have the opposite meaning, and the processes described herein would be reversed and adjusted accordingly, and embodiments are not so limited. In general, an example set of weights are shown, corresponding to the type of link that is determined between two nodes.

Figure 6:
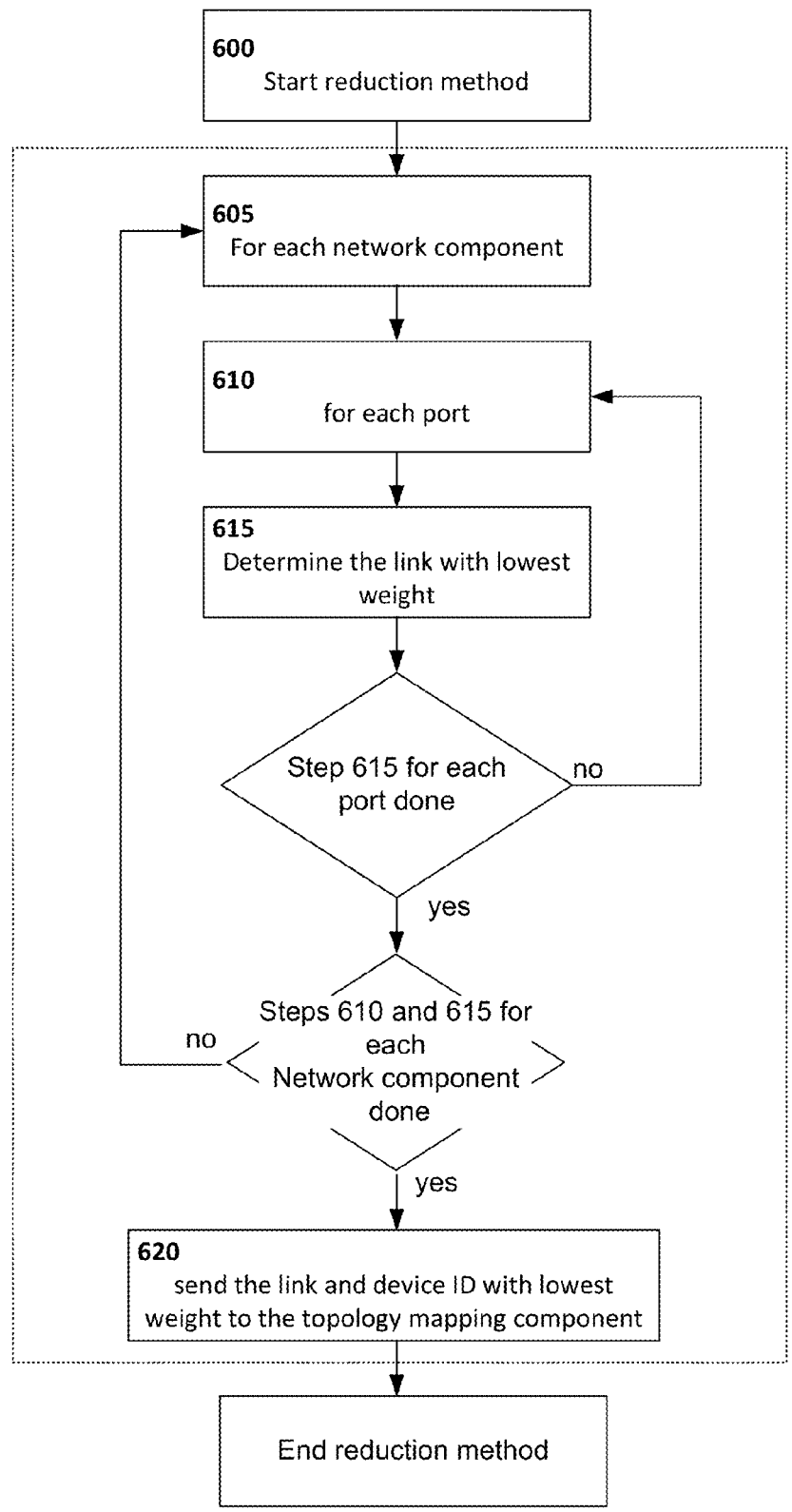
FIG. 6 is a flow chart for the reduction process, according to some embodiments. The process shows that all suggested links are processed one by one and the link with the lowest weight is determined to be the most direct link in the topology.

Referring to FIG. 6, process 600 as shown is a reduction process used on synthetic links previously determined in FIGS. 4A-4B, according to some embodiments. This process may be conducted by correlation engine 310, for example. This process is used to reduce the plurality of the synthetic links to determine true physical/logical topology of the data center communication network. It is based on several conditions. One of the conditions is that the reduction process is performed on the synthetic links with higher weights of the set of synthetic links with variable weights. It is performed for every device and every interface in the device. In the present example, every interface in the device can only have one synthetic link with the lowest weight. Synthetic link-1, synthetic link-2 and synthetic link-3 are a set of synthetic links originating from one port VMNIC-1 to vNIC-1, port 'q', port 'b' respectively (see FIG. 2). These synthetic links are assigned weights using module 500. Thus, in this example the following weights are applied:

Synthetic link-1 with weight 10;
Synthetic link-2 with weight 15;
Synthetic link-3 with weight 15.

Relating to reduction logic, only one synthetic link from VMNIC-1 can exist with the lowest weight. So while correlating the synthetic links, only synthetic link-1 with lowest weight of 10 will be sent to the topology mapping unit.

These conditions are reflected in the process steps described in FIG. 6. The logic described above is reflected in steps 605, 610, 615, and 620, with conditional logic included in between steps 615 and 620 to repeat the processes until all ports and network components are analyzed and reduced.

Figure 7:
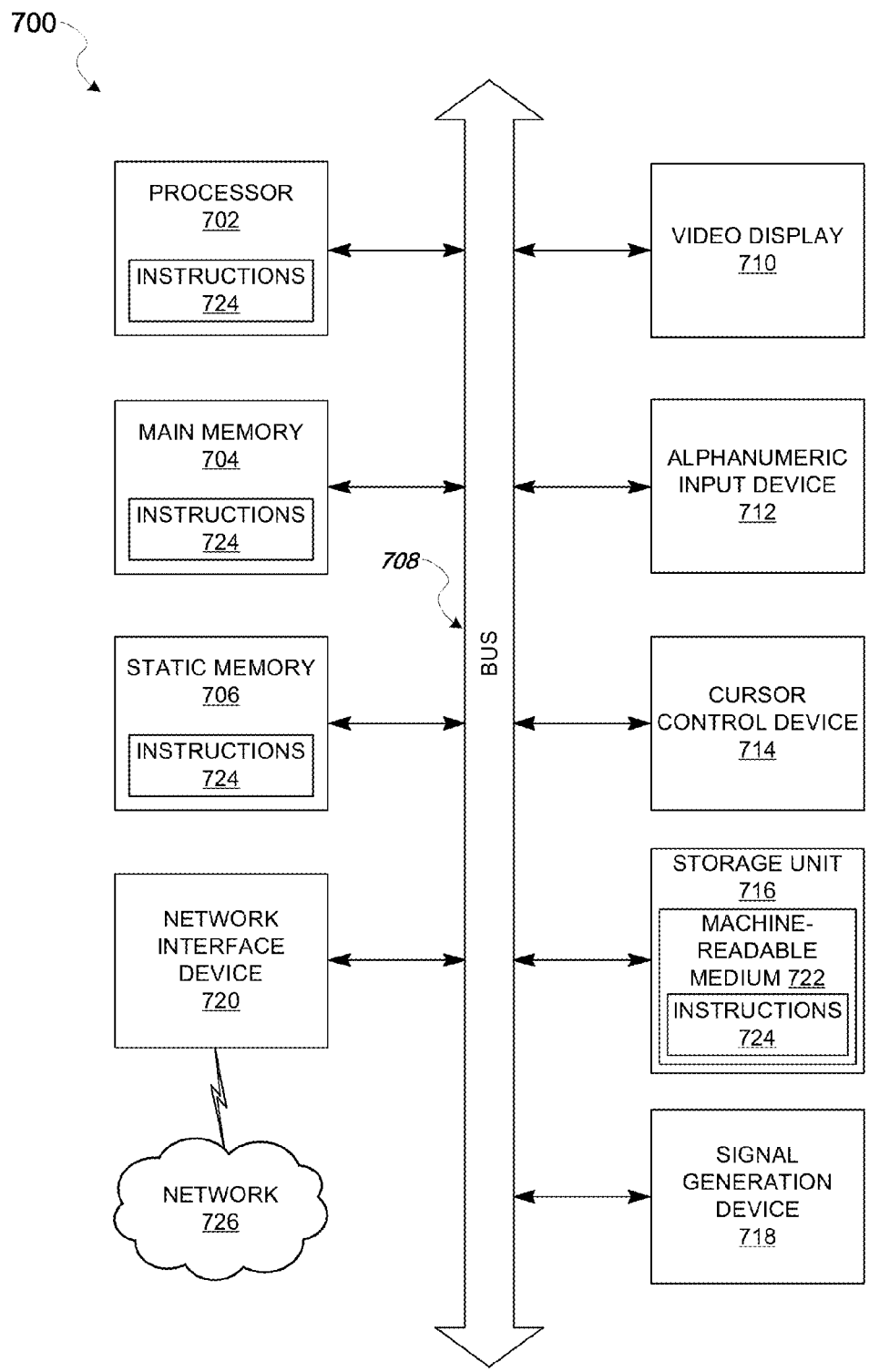
FIG. 7 is a block diagram illustrating components of a machine, according to some example embodiments, able to read instructions from a machine-readable medium and perform any one or more of the methodologies discussed herein.

Referring to FIG. 7, the block diagram illustrates components of a machine 700, according to some example embodiments, able to read instructions 724 from a machine-readable medium 722 (e.g., a non-transitory machine-readable medium, a machine-readable storage medium, a computer-readable storage medium, or any suitable combination thereof) and perform any one or more of the methodologies discussed herein, in whole or in part. Specifically, FIG. 7 shows the machine 700 in the example form of a computer system (e.g., a computer) within which the instructions 724 (e.g., software, a program, an application, an applet, an app, or other executable code) for causing the machine 700 to perform any one or more of the methodologies discussed herein may be executed, in whole or in part.

In alternative embodiments, the machine 700 operates as a standalone device or may be connected (e.g., networked) to other machines. In a networked deployment, the machine 700 may operate in the capacity of a server machine or a client machine in a server-client network environment, or as a peer machine in a distributed (e.g., peer-to-peer) network environment. The machine 700 may include hardware, software, or combinations thereof, and may, as example, be a server computer, a client computer, a personal computer (PC), a tablet computer, a laptop computer, a netbook, a cellular telephone, a smartphone, a set-top box (STB), a personal digital assistant (PDA), a web appliance, a network router, a network switch, a network bridge, or any machine capable of executing the instructions 724, sequentially or otherwise, that specify actions to be taken by that machine. Further, while only a single machine 700 is illustrated, the term "machine" shall also be taken to include any collection of machines that individually or jointly execute the instructions 724 to perform all or part of any one or more of the methodologies discussed herein.

The machine 700 includes a processor 702 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 704, and a static memory 706, which are configured to communicate with each other via a bus 708. The processor 702 may contain microcircuits that are configurable, temporarily or permanently, by some or all of the instructions 724 such that the processor 702 is configurable to perform any one or more of the methodologies described herein, in whole or in part. For example, a set of one or more microcircuits of the processor 702 may be configurable to execute one or more modules (e.g., software modules) described herein.

The machine 700 may further include a video display 710 (e.g., a plasma display panel (PDP), a light emitting diode (LED) display, a liquid crystal display (LCD), a projector, a cathode ray tube (CRT), or any other display capable of displaying graphics or video). The machine 700 may also include an alphanumeric input device 712 (e.g., a keyboard or keypad), a cursor control device 714 (e.g., a mouse, a touchpad, a trackball, a joystick, a motion sensor, an eye tracking device, or other pointing instrument), a storage unit 716, a signal generation device 718 (e.g., a sound card, an amplifier, a speaker, a headphone jack, or any suitable combination thereof), and a network interface device 720.

The storage unit 716 includes the machine-readable medium 722 (e.g., a tangible and non-transitory machine-readable storage medium) on which are stored the instructions 724 embodying any one or more of the methodologies or functions described herein, including, for example, any of the descriptions of FIGS. 1-6. The instructions 724 may also reside, completely or at least partially, within the main memory 704, within the processor 702 (e.g., within the processor's cache memory), or both, before or during execution thereof by the machine 700. The instructions 724 may also reside in the static memory 706.

Accordingly, the main memory 704 and the processor 702 may be considered machine-readable media 722 (e.g., tangible and non-transitory machine-readable media). The instructions 724 may be transmitted or received over a network 726 via the network interface device 720. For example, the network interface device 720 may communicate the instructions 724 using any one or more transfer protocols (e.g., HTTP). The machine 700 may also represent example means for performing any of the functions described herein, including the processes described in FIGS. 1-6.

In some example embodiments, the machine 700 may be a portable computing device, such as a smart phone or tablet computer, and have one or more additional input components (e.g., sensors or gauges) (not shown). Examples of such input components include an image input component (e.g., one or more cameras), an audio input component (e.g., a microphone), a direction input component (e.g., a compass), a location input component (e.g., a GPS receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

As used herein, the term "memory" refers to a machine-readable medium 722 able to store data temporarily or permanently and may be taken to include, but not be limited to, random-access memory (RAM), read-only memory (ROM), buffer memory, flash memory, and cache memory. While the machine-readable medium 722 is shown in an example embodiment to be a single medium, the term "machine-readable medium" should be taken to include a single medium or multiple media (e.g., a centralized or distributed database, or associated caches and servers) able to store instructions 724. The term "machine-readable medium" shall also be taken to include any medium, or combination of multiple media, that is capable of storing the instructions 724 for execution by the machine 700, such that the instructions 724, when executed by one or more processors of the machine 700 (e.g., processor 702), cause the machine 700 to perform any one or more of the methodologies described herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible (e.g., non-transitory) data repositories in the form of a solid-state memory, an optical medium, a magnetic medium, or any suitable combination thereof.

Furthermore, the machine-readable medium 722 is non-transitory in that it does not embody a propagating signal. However, labeling the tangible machine-readable medium 722 as "non-transitory" should not be construed to mean that the medium is incapable of movement; the medium should be considered as being transportable from one physical location to another. Additionally, since the machine-readable medium 722 is tangible, the medium may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute software modules (e.g., code stored or otherwise embodied on a machine-readable medium 722 or in a transmission medium), hardware modules, or any suitable combination thereof. A "hardware module" is a tangible (e.g., non-transitory) unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor 702 or a group of processors 702) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor 702 or other programmable processor 702. It will be appreciated that the decision to implement a hardware module mechanically, in dedicated and permanently configured circuitry, or in temporarily configured circuitry (e.g., configured by software) may be driven by cost and time considerations.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses 708) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors 702 that are temporarily configured (e.g., by software) or permanently configured to perform the relevant operations. Whether temporarily or permanently configured, such processors 702 may constitute processor-implemented modules that operate to perform one or more operations or functions described herein. As used herein, "processor-implemented module" refers to a hardware module implemented using one or more processors 702.

Similarly, the methods described herein may be at least partially processor-implemented, a processor 702 being an example of hardware. For example, at least some of the operations of a method may be performed by one or more processors 702 or processor-implemented modules. As used herein, "processor-implemented module" refers to a hardware module in which the hardware includes one or more processors 702. Moreover, the one or more processors 702 may also operate to support performance of the relevant operations in a "cloud computing" environment or as a "software as a service" (SaaS). For example, at least some of the operations may be performed by a group of computers (as examples of machines 700 including processors 702), with these operations being accessible via a network 726 (e.g., the Internet) and via one or more appropriate interfaces (e.g., an API).

The performance of certain operations may be distributed among the one or more processors 702, not only residing within a single machine 700, but deployed across a number of machines 700. In some example embodiments, the one or more processors 702 or processor-implemented modules may be located in a single geographic location (e.g., within a home environment, an office environment, or a server farm). In other example embodiments, the one or more processors 702 or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine 700 (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

The present disclosure is illustrative and not limiting. Further modifications will be apparent to one skilled in the art in light of this disclosure and are intended to fall within the scope of the appended claims.

What is claimed is:

1. A method for discovering a network topology, the network comprising a plurality of network components all communicatively coupled together, the method comprising:
    accessing, by a data collector module, network activity data for each component in the network via one or more network connector modules, the network activity data comprising evidence of a type of link between pairs of network components in the network;
    generating, by a correlation engine, a plurality of synthetic links, each synthetic link representing a communicative connection between a first port of a first network component and a second port of a second network component, wherein the generating synthetic links is based on the network activity data;
    assigning, by the correlation engine, a numerical weight value to each of the plurality of synthetic links, wherein the assigning for each synthetic link is based on the evidence of a type of link established between the two network components comprising said synthetic link;
    conducting, by the correlation engine, a reduction logic routine that determines, for each network component and for each port of said network component, which synthetic link connected to said port is the most reduced weight; and
    transmitting, by the correlation engine to a topology mapping unit, for each network component and for each port of said network component, the most reduced weight synthetic link for display as a direct link in a network topology map.

2. The method of claim 1, wherein the network activity data comprises evidence of communication between network components derived from SNMP, ping, SSH/Telnet, NaviSecCli, NMAP, or Pysphere.

3. The method of claim 1, wherein the network activity data comprises raw data of different types of network communications, and the method further comprises normalizing the network activity data by converting the different types of network communications to a common data format.

4. The method of claim 1, wherein the correlation engine generates the synthetic links using CDP link creation logic, MAC address link creation logic, VMWARE integration logic, Link aggregation logic, or F5 load balancer virtual server logic.

5. The method of claim 1, wherein the network components comprise at least one router, at least one switch, at least one physical server, and at least one virtual server.

6. The method of claim 5, wherein the network components further comprise at least one virtual machine manager and a system manager.

7. The method of claim 1, wherein the type of link established between two network components that the weight values are based on includes: a virtual machine to virtual switch link type, a virtual machine to top of rack switch type, a top of rack switch to bare metal link type, or a virtual switch to server virtualized NIC link type.

8. A method for discovery a network topology, the network comprising a first network component directly communicatively coupled to a second network component, and the second network component directly communicatively coupled to a third network component, the method comprising:
    accessing, by a data collector module, network activity data via one or more network connector modules, the network activity data comprising evidence of a type of link between the first and second network components, the first and third network components, and the second and third network components in the network;

generating, by a correlation engine:
a first synthetic link representing a first communicative connection between the first and second network components,
a second synthetic link representing a second communicative connection between the first and third network components, and
a third synthetic link representing a third communicative connection between the second and third network components,
wherein the generating the synthetic links is based on the network activity data; assigning, by the correlation engine: a first numerical weight value to the first synthetic link, based on the evidence of a type of link established between the first and second network components,
a second numerical weight value to the second synthetic link, based on the evidence of a type of link established between the first and third network components, and
a third numerical weight value to the third synthetic link, based on the evidence of a type of link established between the second and third network components,
wherein the second numerical weight value is greater than the first and third numerical weight values;
conducting, by the correlation engine, a reduction logic routine that determines that: the first synthetic link is a direct link between the first and second network components,
the third synthetic link is a direct link between the second and third network components, and the second synthetic link is not a direct link between any two network components, wherein the determining is based on comparing the first, second, and third numerical weights and performing reduction logic to determine the smallest weight values; and
transmitting, by the correlation engine to a topology mapping unit, the first synthetic link and the third synthetic link for display as direct links in a network topology map.

9. The method of claim 8, wherein the network activity data comprises evidence of communication between network components derived from SNMP, ping, SSH/Telnet, NaviSecCli, NMAP, or Pysphere.

10. The method of claim 8, wherein the network activity data comprises raw data of different types of network communications, and the method further comprises normalizing the network activity data by converting the different types of network communications to a common data format.

11. The method of claim 8, wherein the correlation engine generates the first, second, and third synthetic links using CDP link creation logic, MAC address link creation logic, VMWARE integration logic, Link aggregation logic, or F5 load balancer virtual server logic.

12. The method of claim 8, wherein the network components comprise at least one virtual machine manager and a system manager.

13. The method of claim 8, wherein the type of link established between two network components that the weight values are based on includes: a virtual machine to virtual switch link type, a virtual machine to top of rack switch type, a top of rack switch to bare metal link type, or a virtual switch to server virtualized NIC link type.

14. A system for discovering a network topology, the network comprising a plurality of network components all communicatively coupled together, the system comprising:
a data collector module comprising a first processor and a first memory;
a correlation engine comprising a second processor and a second memory and communicatively coupled to the data collector; and
a topology mapping unit comprising a display, a third processor and a third memory and communicatively coupled to the correlation engine;
the data collector module configured to:
access network activity data for each component in the network via one or more network connector modules, the network activity data comprising evidence of a type of link between pairs of network components in the network;
the correlation engine configured to:
generate a plurality of synthetic links, each synthetic link representing a communicative connection between a first port of a first network component and a second port of a second network component, wherein the generating synthetic links is based on the network activity data; assign a numerical weight value to each of the plurality of synthetic links, wherein the assigning for each synthetic link is based on the evidence of a type of link established between the two network components comprising said synthetic link;
conduct a reduction logic routine that determines, for each network component and for each port of said network component, which synthetic link connected to said port is the most reduced weight; and
transmit, by the correlation engine to a topology mapping unit, for each network component and for each port of said network component, the most reduced weight synthetic link; and
the topology mapping unit configured to display each reduced link as a direct link in a network topology map.

15. The system of claim 14, wherein the network activity data comprises evidence of communication between network components derived from SNMP, ping, SSH/Telnet, NaviSecCli, NMAP, or Pysphere.

16. The system of claim 14, wherein the network activity data comprises raw data of different types of network communications, and the method further comprises normalizing the network activity data by converting the different types of network communications to a common data format.

17. The system of claim 14, wherein the correlation engine is further configured to generate the synthetic links using CDP link creation logic, MAC address link creation logic, VMWARE integration logic, Link aggregation logic, or F5 load balancer virtual server logic.

18. The system of claim 14, wherein the network components comprise at least one router, at least one switch, at least one physical server, and at least one virtual server.

19. The system of claim 18, wherein the network components further comprise at least one virtual machine manager and a system manager.

20. The system of claim 14, wherein the type of link established between two network components that the weight values are based on includes: a virtual machine to virtual switch link type, a virtual machine to top of rack switch type, a top of rack switch to bare metal link type, or a virtual switch to server virtualized NIC link type.

* * * * *